United States Patent
Cowelchuk et al.

(10) Patent No.: US 8,794,661 B2
(45) Date of Patent: Aug. 5, 2014

(54) VEHICLE INTERIOR ASSEMBLY

(75) Inventors: Glenn A. Cowelchuk, Holland, MI (US); Gregg S. Evans, Stratford (CA)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/697,392

(22) PCT Filed: May 11, 2011

(86) PCT No.: PCT/US2011/036015
§ 371 (c)(1),
(2), (4) Date: Feb. 25, 2013

(87) PCT Pub. No.: WO2011/143282
PCT Pub. Date: Nov. 17, 2011

(65) Prior Publication Data
US 2013/0147166 A1    Jun. 13, 2013

Related U.S. Application Data

(60) Provisional application No. 61/333,534, filed on May 11, 2010.

(51) Int. Cl.
   *B60R 21/20* (2011.01)
(52) U.S. Cl.
   USPC ................................................. 280/728.3
(58) Field of Classification Search
   USPC ................................. 280/728.2, 728.3, 732
   See application file for complete search history.

(56) References Cited

U.S. PATENT DOCUMENTS

| | | | |
|---|---|---|---|
| 4,791,019 A | | 12/1988 | Ohta et al. |
| 5,080,393 A | * | 1/1992 | Dixon et al. ................... 280/732 |
| 5,403,645 A | | 4/1995 | Stein et al. |
| 5,527,574 A | * | 6/1996 | Iannazzi et al. ................ 428/43 |
| 5,590,901 A | | 1/1997 | MacGregor |
| 5,845,931 A | * | 12/1998 | Nagy et al. ................. 280/728.3 |
| 6,076,851 A | * | 6/2000 | Davis et al. ................ 280/728.2 |
| 6,158,763 A | * | 12/2000 | Dominique et al. ........ 280/728.2 |
| 6,440,514 B1 | * | 8/2002 | Ueno et al. ..................... 428/43 |
| 6,447,004 B1 | * | 9/2002 | Kawakubo et al. ......... 280/728.3 |
| 6,644,685 B2 | * | 11/2003 | Sun et al. ................... 280/728.3 |

(Continued)

FOREIGN PATENT DOCUMENTS

| | | |
|---|---|---|
| JP | 06-115025 | 4/1994 |
| JP | 08-085408 | 4/1996 |

(Continued)

OTHER PUBLICATIONS

European Search Report dated Sep. 24, 2013.

(Continued)

*Primary Examiner* — Paul N Dickson
*Assistant Examiner* — Robert A Coker
(74) *Attorney, Agent, or Firm* — Fletcher Yoder, P.C.

(57) ABSTRACT

A vehicle interior assembly includes a class A visible surface material having a first layer formed from a thermal plastic olefin and a second layer formed from a foam. The vehicle interior assembly also includes a substrate supporting the class A visible surface material. The substrate defines an opening for receiving a drop-in chute having an outer surface. In addition, the vehicle interior assembly includes a retention mechanism for securing the outer surface of the drop-in chute to the substrate.

20 Claims, 7 Drawing Sheets

(56) References Cited

U.S. PATENT DOCUMENTS

| | | | |
|---|---|---|---|
| 6,651,998 B1 * | 11/2003 | Mayer et al. | 280/728.3 |
| 6,753,057 B1 * | 6/2004 | Gardner, Jr. | 428/43 |
| 7,219,922 B2 * | 5/2007 | DePue et al. | 280/732 |
| 7,611,163 B2 * | 11/2009 | Schweizer et al. | 280/728.3 |
| 2001/0026063 A1 * | 10/2001 | Yokota | 280/732 |
| 2002/0043788 A1 | 4/2002 | Gallagher et al. | |
| 2002/0074782 A1 | 6/2002 | Saito | |
| 2006/0267313 A1 * | 11/2006 | Yasuda et al. | 280/728.3 |
| 2010/0230939 A1 * | 9/2010 | Mazzocchi et al. | 280/732 |

FOREIGN PATENT DOCUMENTS

| | | |
|---|---|---|
| JP | 2003-011765 | 1/2003 |
| JP | 2003095049 | 4/2003 |
| JP | 2008001290 | 10/2008 |
| JP | 2009067236 | 4/2009 |

OTHER PUBLICATIONS

Korean Office Action dated Dec. 20, 2013.
Japanese Office Action dated Feb. 18, 2014.

* cited by examiner

VEHICLE INTERIOR ASSEMBLY

CROSS-REFERENCE TO RELATED APPLICATION

This U.S. National Stage Patent Application claims the benefit of International Patent Application Serial No. PCT/US2011/036015 filed May 11, 2011, entitled "Vehicle Interior Assembly" which claims the benefit of U.S. Provisional Patent Application Ser. No. 61/333,534 filed May 11, 2010, entitled "Vehicle Interior Assembly," the entire disclosure of these applications being considered part of the disclosure of this application, and hereby incorporated by reference.

BACKGROUND

1. Field of the Invention

The present invention is directed to a vehicle interior assembly and more specifically to a vehicle interior assembly that includes airbags and a method of forming thereof.

2. Related Art

As more and more manufacturers strive to enhance the interior design of vehicles to differentiate their products, one such differentiation has been the removal of visible airbag seams from the vehicle interior assemblies such as the dashboard. Manufacturers have been trying to produce a class A interior surfaces on vehicle dashboards that is free of visible airbag lines, seams or any other markers that denotes the location of the airbag. Even though the class A surface may originally be formed without seams, many times unintentional seams around the drop-in chute including a cover over the airbag assembly result over time.

To eliminate many of these previously intended seams as well as unintended visible seams in soft instrument panels, manufacturers have developed two basic techniques. The first technique is to place the drop-in chute into an opening in the substrate of the vehicle interior assembly and then apply urethane foam between the assembly and the class A visible skin. One cause of unintended lines on the class A surface is the movement of the cover relative to the substrate, and these lines typically occur unless at least 6 mm foam-in-place skin on a class A surface is provided. The second method is to securely and permanently affix a cover over the airbag from movement relative to the substrate before applying a thinner class A surface. In the second method the cover is typically securely vibration welded or adhered to the substrate, and then a less than 5 mm by bilaminate material may be applied.

Each of the above methods provides a suitable method for ensuring against unintended lines or other visible markers showing where the airbag cover of the drop-in chute is located relative to the substrate. However, each of the above methods is relatively expensive and time consuming. More specifically, in the first method, the typical 6-8 mm foam-in-place class A surface requires additional material as well as the foam-in-place process. In regards to the second method, it requires a vibration weld process or other method of bonding or adhering the drop-in chute semi-permanently to the substrate. These vibration weldings as well as adhesion or bonding processes are time consuming and raise the manufacturing costs of the end assembly.

In view of the above, Applicants have developed a more cost-effective manufacturing process that uses less material and reduces the manufacturing time.

SUMMARY

The present invention is directed to a vehicle interior assembly and more specifically to a vehicle interior assembly that includes airbags and a method of forming thereof.

The present invention is configured to use a drop-in chute that while substantially affixed to the substrate is not permanently affixed against movement of the drop-in chute relative to the substrate until the airbag intentionally ruptures the drop-in chute. In addition, the present invention uses a 5 mm or less bilaminate material as the class A surface. To further improve assembly and manufacturing process, the drop-in chute is formed using a retention assembly that locks the drop-in chute relative to the substrate. The retention assembly is configured to minimize movement of the drop-in chute relative to the substrate. Through careful selection of the retention assembly as well as the bilaminate material and the thickness of the bilaminate material, the visibility of unintended lines at seams illustrating the location of the drop-in chute on the class A surface is minimized.

BRIEF DESCRIPTION OF THE DRAWINGS

Various exemplary embodiments of the systems and methods according to the present disclosure will be described in detail, with reference to the following figures, wherein.

DETAILED DESCRIPTION

Figure 1:
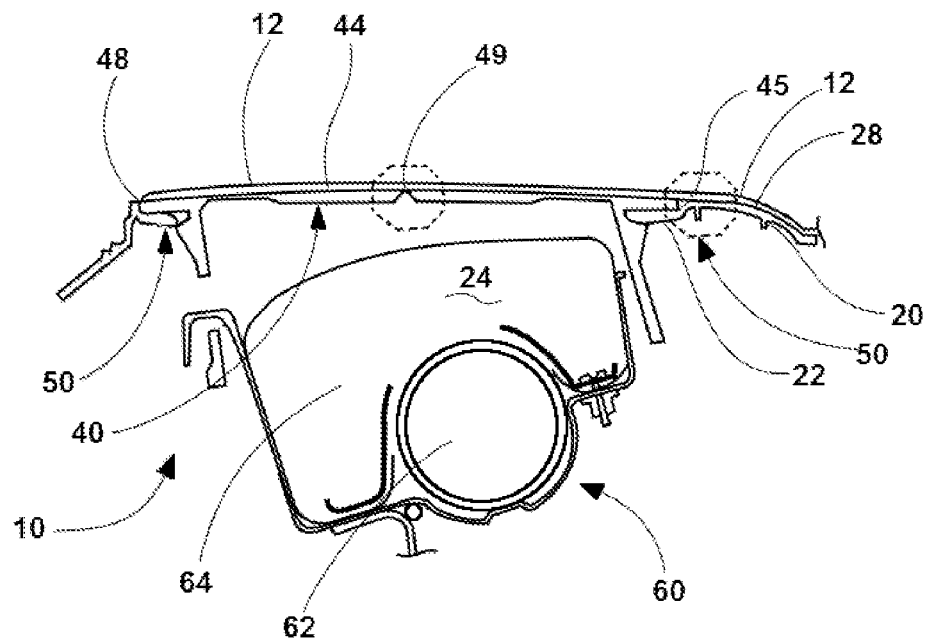
FIG. 1 illustrates a partial cross-sectional view of a prior art interior assembly having a drop-in chute that is vibration welded to the substrate.
Figure 2:
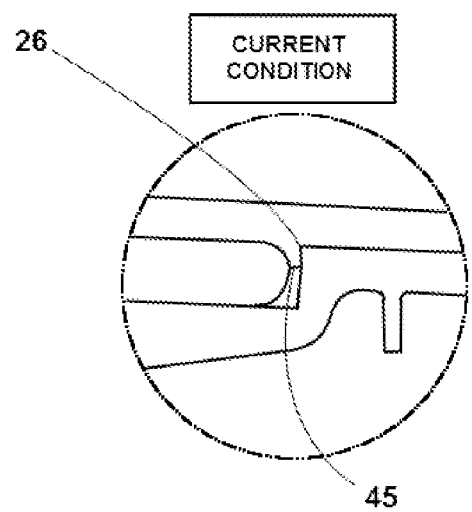
FIG. 2 is an enlarged cross-sectional view of the weld joint in FIG. 1.
Figure 3:
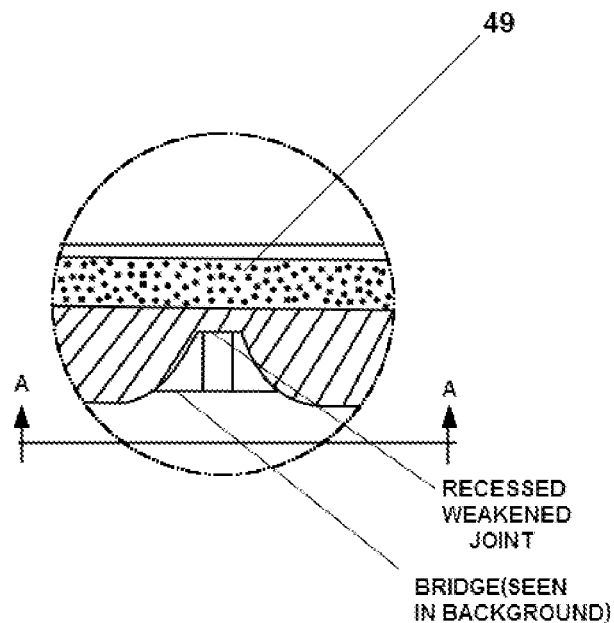
FIG. 3 is an enlarged cross section of a tear seam.
Figure 4:
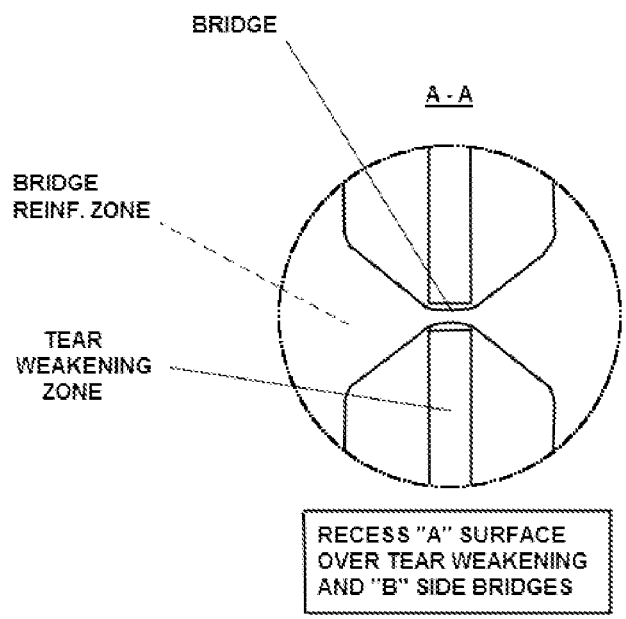
FIG. 4 is a different view of the tear seam in FIG. 3, along lines A-A.

The present invention is directed generally to an interior assembly 10 having a substrate 20 forming an opening into which a drop-in chute 40 is placed. The drop-in chute retention assembly 50 positions and holds in place the drop-in chute 40.

The substrate 20 may be any interior substrate such as a vehicle dashboard, door panels and the like. The substrate may be formed out of any known material that is used for dashboards or other desired panels and surfaces. The substrate 20 provides basic structural support for the dashboard or other vehicle interior component. Other structural members may attach the vehicle interior assembly 10 particularly the substrate 20 to the body of the vehicle and are not illustrated herein. The substrate 20 may also form other interior components of the vehicle as the base such as for interior door panels, side panels, and any other place in the vehicle where it is desirable to have a cover over an airbag assembly.

The substrate 20 generally includes an opening 24 to receive the drop-in chute 40. The opening 24 includes an opening perimeter 26 and a support area 22 configured such that the drop-in chute 40 overlaps a portion of the substrate 20. The opening 24 may be configured in any desired size and shape so long as it releases the airbag easily and repeatably as desired and in the direction desired. The support area 22 may vary depending upon the selected retention assembly 50. The profile of the support area 22 between the upper surface 28 of the substrate 20 and the opening perimeter 26 is discussed in more detail below in relation to the retention assembly 50.

The drop-in chute 40 may be formed in a variety of desired sizes, shapes and styles. The drop-in chute 40 may be configured to have one side release in a hinge fashion, split in the center or any other method that allows the airbag assembly 60 to deploy safely through or around the drop-in chute 40. The drop-in chute 40 may be formed out of a single molded piece. The drop-in chute 40 generally includes an outer surface 44 which engages the class A surface material 12 that extends over the drop-in chute 40. The drop-in chute 40 also includes an outer perimeter 42 and is in the relative proximity to the outer perimeter 42 which has an outer profile 48 that is configured to match or to gauge the profile of the substrate 20 relative to the opening 24. The drop-in chute 40 is generally made out of similar materials to the substrate 20 but may be made out of any other desirable materials. The drop-in chute 40 may have a tear seam 49 to allow for easy release. The gap between the substrate 20 and drop-in chute around the perimeter of the drop-in chute 40 is generally a distance less than 1.2 mm.

The airbag assembly 60 may be any desirable airbag assembly, configured to fit within the selected location. The airbag assembly 60 generally includes an airbag canister 62 which holds the charge for activating the airbag 64. The airbag assembly 60 may be varied in desired size, shape and configuration dependent upon the location of the vehicle, type of vehicle and desired size. For example, the configuration of the airbag assembly 60 may vary greatly depending upon whether it is a passenger side airbag located in the front dashboard, driver side airbag in the steering wheel, or a side impact airbag located in a rear door panel. The airbag assembly 60 is assembled into the drop-in chute.

Figure 5:
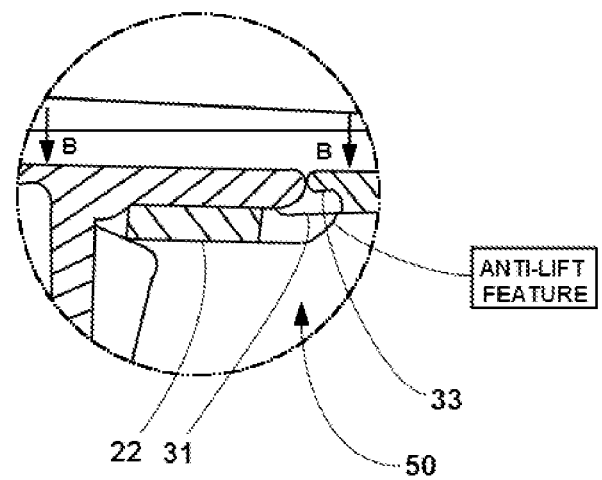
FIG. 5 is a cross-sectional view of an anti-lift edge nib design.
Figure 6:
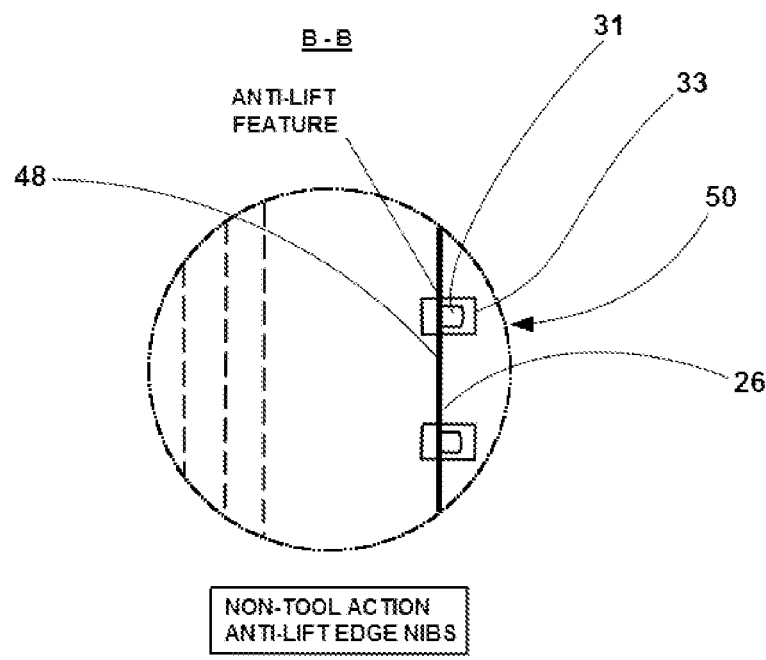
FIG. 6 is an enlarged cross-sectional view of the anti-lift edge nibs in FIG. 5, along lines B-B.
Figure 7:
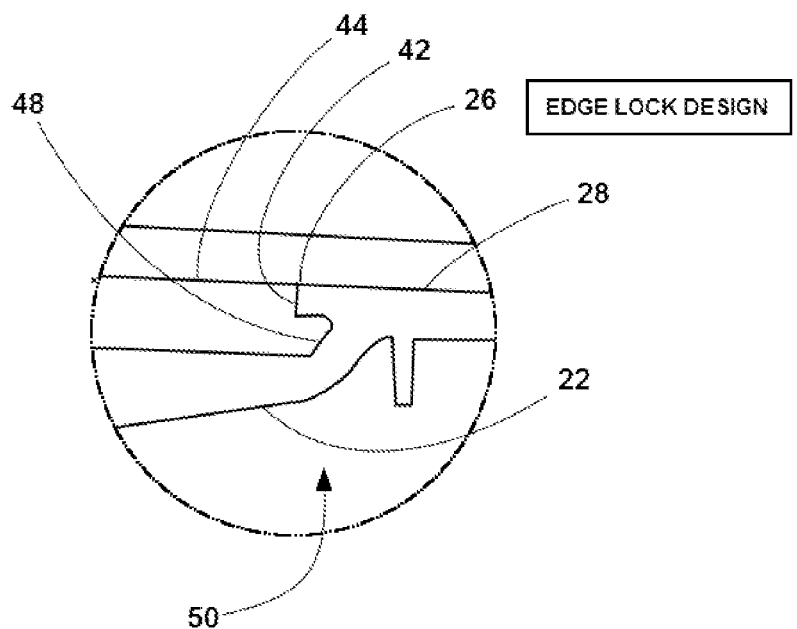
FIG. 7 is an enlarged cross-sectional view of an edge lock design.

As illustrated in FIGS. 5-8, the drop-in chute 40 and substrate 20 may include a retention assembly 50. The retention assembly 50 may vary in size, shape and style configuration; however, the retention assembly must substantially constrain the drop-in chute 40 from moving relative to the substrate 20. An edge lock design is illustrated in FIG. 7, which is easy to manufacture and allows for efficient repeatable deployment of the airbag. During the assembly operation, the drop-in chute 40 is simply press fit into the opening 24 on the substrate 20. During deployment, the drop-in chute 40 tears along the tear seam 49 and bends at hinge line 61 during a deployment to provide a door through which air bag 24 is deployed. The edges of either the substrate opening or drop-in chute outer perimeter 42 may be applied with a light adhesive or bonding material and then quickly pressed into place to further minimize relative movement between the drop-in chute 40 and the substrate 20. An approximately 6 mm or less, preferably 5.5 mm bilaminate material may be applied over the outer surfaces 28, 48 of the substrate 20 and drop-in chute 40, respectively. As illustrated in FIGS. 5-6, a variation of the edge lock, described as anti-lift edge nibs 31 inserted into cavities 33 on the substrate 20 may also be used. A caulk also may be used as the retention mechanism. The substrate may also be melted to the drop-in chute.

Figure 8:
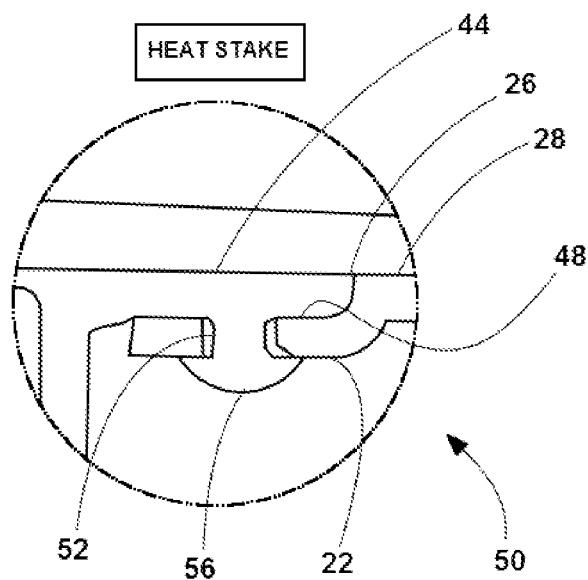
FIG. 8 is an enlarged cross-sectional view of a stake design.
Figure 9:
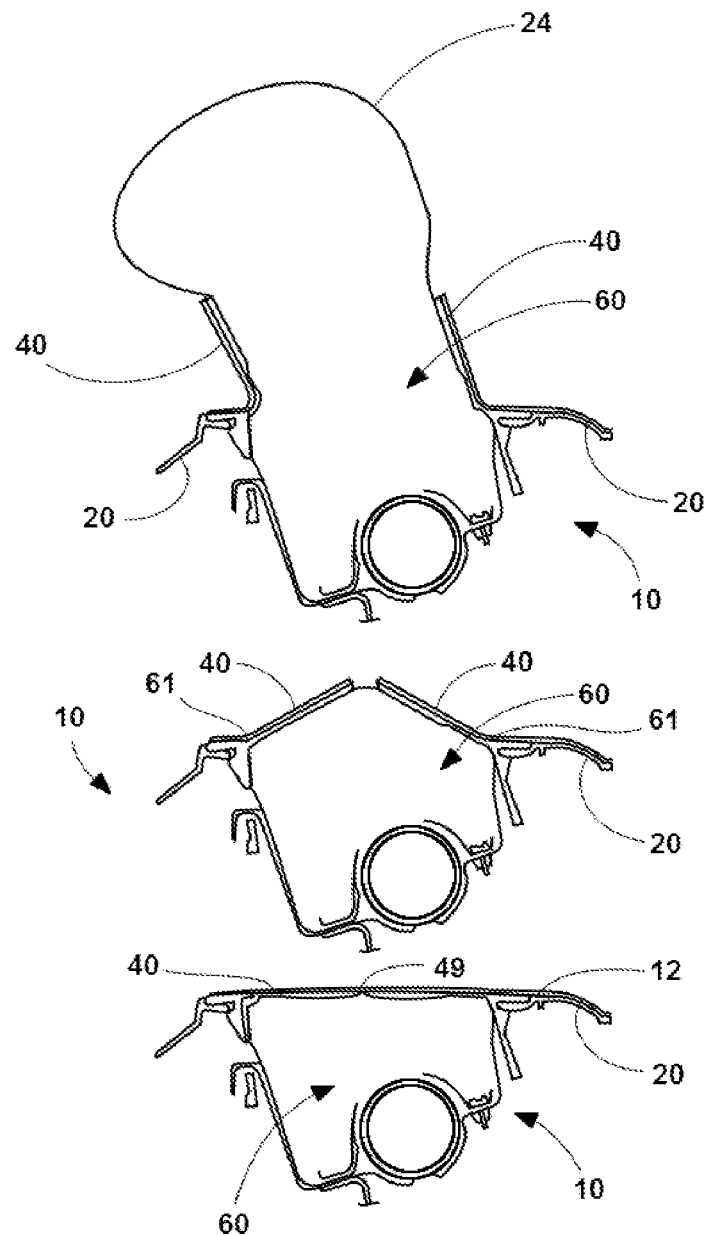
FIG. 9 is a cross-sectional view showing the sequence of deployment of the airbag.
Figure 10:
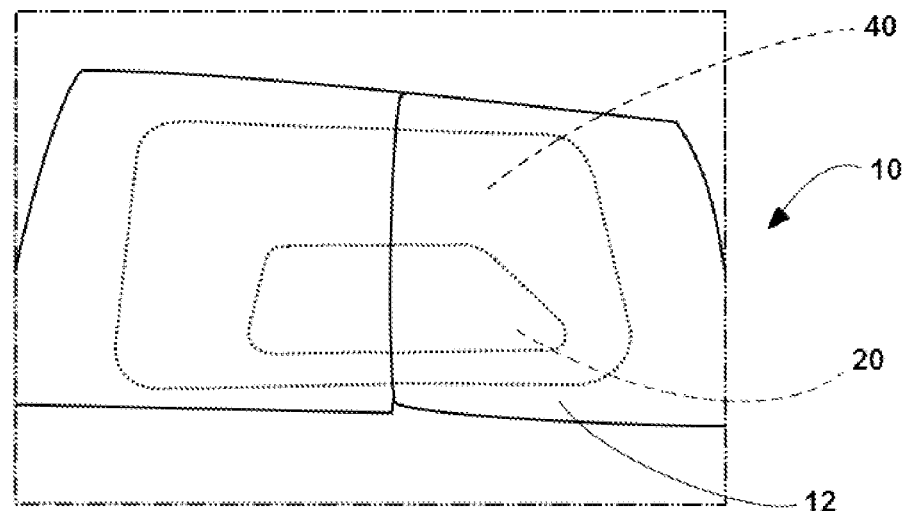
FIG. 10 is a picture of an exemplary interior assembly showing issues with the outline of the drop-in chute visible on the class A surface.
Figure 11:
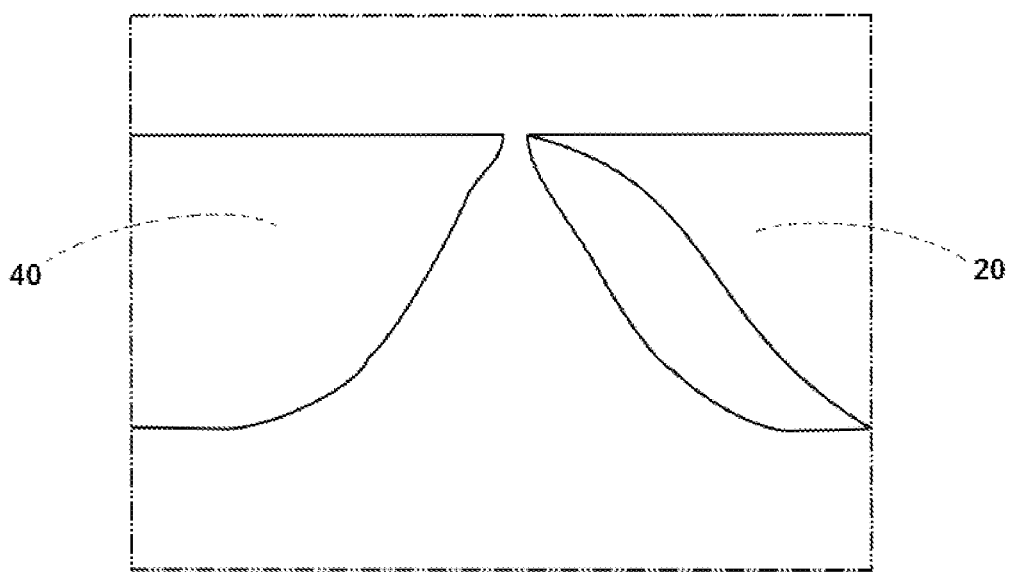
FIG. 11 is a picture of a cross section of the drop-in chute.
Figure 12:
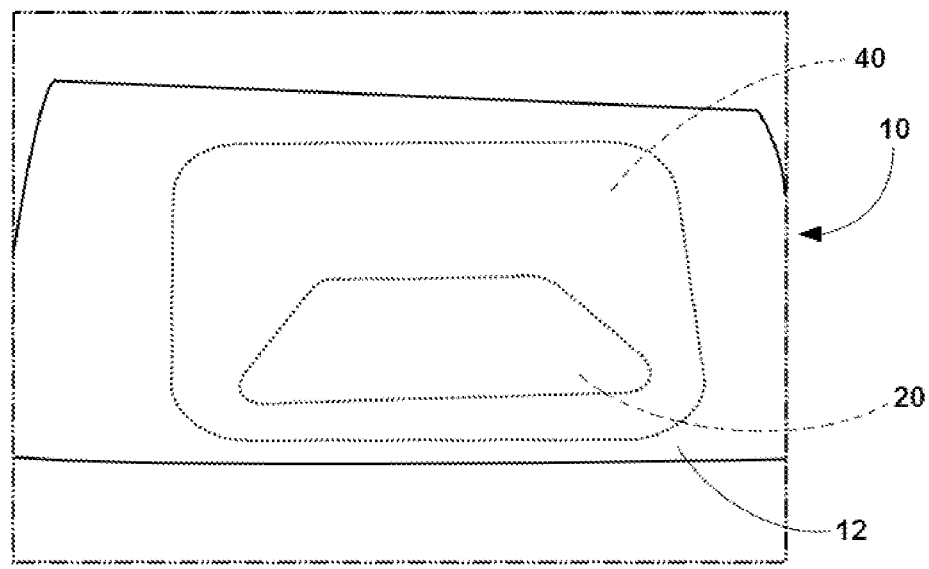
FIG. 12 is a picture of an exemplary interior assembly showing reduced markings of the location of the drop-in chute on the class A surface as compared to FIG. 10.

As illustrated in FIG. 8, a plurality of heat stakes 56 may be used as part of the retention assembly 50. The heat stakes 56 generally fit into a cavity 52 or opening to securely locate drop-in chute 40 relative to the substrate 20. To enhance the retention of the drop-in chute 40 as well as reduce the amount of movement of the drop-in chute 40 relative to the substrate, the number of heat stakes 56 may be increased as desired. The heat stakes 56 may be formed in any desired size, shape or configuration as well as being formed out of different materials than the drop-in chute 40. For example, the stake 56 may be formed in a mushroom shape, multi-prong or any other desired style that allows for easy insertion into the opening 52 and then retention relative to the substrate thereby minimizing movement of the drop-in chute 40 relative to the substrate.

The class A surface 12 is formed from a 6 mm or less, preferably a 5.5 mm or less, or more preferably a 5 mm or less, bilaminate material. The bilaminate is normally formed from a thermal plastics olefin as the visible surface with a layer of polypropylene or expanded polypropylene foam. Vinyl or polyurethane may be used also typically in combination with this foam or polyurethane with this foam. The substrate 20 is normally polypropylene or thermal plastics olefin, but also could be made of any suitable plastic. The drop-in chute 40 is normally high rubber content thermal plastics olefin. A trilaminate may also be used in place of the bilaminate film. The bilaminate or trilaminate material is not scored. The foam used generally has a density of about 32 kg/m$^3$-72.1 kg/m$^3$, preferable 40 kg/m$^3$-64.1 kg/m$^3$.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A vehicle interior assembly comprising:
   a class A visible surface material having a first layer formed from a thermal plastic olefin and a second layer formed from a foam having a thickness of less than 6 mm and a density of less than 72.1 kg/m$^3$;
   a substrate supporting the class A visible surface material, wherein the substrate defines an opening for receiving a drop-in chute having an outer surface; and
   a retention mechanism for securing the outer surface of the drop-in chute to the substrate, wherein the retention mechanism comprises a profile extending from a perimeter of the drop-in chute, the profile is configured to engage a corresponding recess within the substrate as the drop-in chute is press-fit into the opening of the substrate, and contact between an outwardly facing surface of the profile and an inwardly facing surface of the recess blocks movement of the drop-in chute relative to the substrate in a direction toward the class A visible surface material.

2. The vehicle interior assembly of claim 1, wherein the foam has a density of 32 kg/m$^3$ to 72.1 kg/m$^3$.

3. The vehicle interior assembly of claim 1, wherein the vehicle interior assembly includes a perimeter gap between the drop-in chute and the substrate.

4. The vehicle interior assembly of claim 3, wherein the class A visible surface material does not include any score lines in the foam that are approximately aligned with the gap.

5. The vehicle interior assembly of claim 4, wherein the class A visible surface material does not include any score lines in near proximity to the drop-in chute.

6. The vehicle interior assembly of claim 1, wherein the foam is selected from the group consisting of primarily polypropylene foam, expanded polypropylene foam, and a polyurethane foam.

7. The vehicle interior assembly of claim 6, wherein the foam also includes vinyl.

8. The vehicle interior assembly of claim 1, wherein the drop-in chute outer surface includes a high rubber content thermal plastic olefin.

9. The vehicle interior assembly of claim 1, wherein the drop-in chute includes an airbag assembly.

10. A vehicle interior assembly comprising:
a class A visible surface material having a first layer formed from a thermal plastic olefin and a second layer formed from a foam having a thickness of less than 6 mm and a density of less than 72.1 kg/m$^3$;
a substrate supporting the class A visible surface material, wherein the substrate defines an opening for receiving a drop-in chute having an outer surface; and
a retention mechanism for securing the outer surface of the drop-in chute to the substrate, wherein the retention mechanism comprises a heat stake extending inwardly from an inner surface of the drop-in chute, the heat stake is configured to extend through a corresponding hole in the substrate, and deformation of the heat stake establishes an outwardly facing surface that contacts an inwardly facing surface of the substrate to block movement of the drop-in chute relative to the substrate in a direction toward the class A visible surface material.

11. The vehicle interior assembly of claim 10, wherein the foam has a density of 32 kg/m$^3$ to 72.1 kg/m$^3$.

12. The vehicle interior assembly of claim 10, wherein the vehicle interior assembly includes a perimeter gap between the drop-in chute and the substrate.

13. The vehicle interior assembly of claim 12, wherein the class A visible surface material does not include any score lines in the foam that are approximately aligned with the gap.

14. The vehicle interior assembly of claim 13, wherein the class A visible surface material does not include any score lines in near proximity to the drop-in chute.

15. The vehicle interior assembly of claim 10, wherein the foam is selected from the group consisting of primarily polypropylene foam, expanded polypropylene foam, and a polyurethane foam.

16. A vehicle interior assembly comprising:
a class A visible surface material having a first layer formed from a thermal plastic olefin and a second layer formed from a foam having a thickness of less than 6 mm and a density of less than 72.1 kg/m$^3$;
a substrate supporting the class A visible surface material, wherein the substrate defines an opening for receiving a drop-in chute having an outer surface; and
a retention mechanism for securing the outer surface of the drop-in chute to the substrate, wherein the retention mechanism comprises a plurality of nibs each extending from a perimeter of the drop-in chute, each nib engages a corresponding cavity within the substrate, and contact between an outwardly facing surface of each nib and an inwardly facing surface of the corresponding cavity blocks movement of the drop-in chute relative to the substrate in a direction toward the class A visible surface material.

17. The vehicle interior assembly of claim 16, wherein the foam has a density of 32 kg/m$^3$ to 72.1 kg/m$^3$.

18. The vehicle interior assembly of claim 16, wherein the vehicle interior assembly includes a perimeter gap between the drop-in chute and the substrate.

19. The vehicle interior assembly of claim 18, wherein the class A visible surface material does not include any score lines in the foam that are approximately aligned with the gap.

20. The vehicle interior assembly of claim 19, wherein the class A visible surface material does not include any score lines in near proximity to the drop-in chute.

* * * * *